US011164547B2

United States Patent
Sakai

(10) Patent No.: US 11,164,547 B2
(45) Date of Patent: Nov. 2, 2021

(54) METHOD FOR CONTROLLING TERMINAL APPARATUS AND NON-TRANSITORY COMPUTER-READABLE STORAGE MEDIUM STORING A CONTROL PROGRAM FOR CONTROLLING TERMINAL APPARATUS

(71) Applicant: SEIKO EPSON CORPORATION, Tokyo (JP)

(72) Inventor: Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/999,442

(22) Filed: Aug. 21, 2020

(65) Prior Publication Data

US 2021/0056937 A1  Feb. 25, 2021

(30) Foreign Application Priority Data

Aug. 23, 2019 (JP) .............................. JP2019-152634

(51) Int. Cl.
*G09G 5/38* (2006.01)

(52) U.S. Cl.
CPC ....... *G09G 5/38* (2013.01); *G09G 2340/0492* (2013.01)

(58) Field of Classification Search
CPC .............. G09G 5/38; G09G 2340/0492; G06F 2200/1614
See application file for complete search history.

(56) References Cited

U.S. PATENT DOCUMENTS

| 9,977,515 B2* | 5/2018 | Ichieda | ............... G06F 3/03545 |
| 2010/0066763 A1* | 3/2010 | Macdougall | .......... G06F 1/1626 345/656 |
| 2012/0040719 A1* | 2/2012 | Lee | ..................... G09G 3/2092 455/557 |

FOREIGN PATENT DOCUMENTS

| JP | 2010-122485 A | 6/2010 |
| JP | 2015-141365 A | 8/2015 |

* cited by examiner

*Primary Examiner* — Samantha (Yuehan) Wang
(74) *Attorney, Agent, or Firm* — Oliff PLC

(57) ABSTRACT

There is provided a method for controlling a terminal apparatus that includes a first display section and a motion sensor that detects the attitude of the first display section with respect to the gravity direction and supplies image data to a display apparatus including a second display section. The method includes causing the motion sensor to detect the vertical direction, rotating a source image in accordance with the detected vertical direction and generating corresponding first image data, causing the first display section to display an image indicated by the first image data, and transmitting the first image data to the display apparatus. In the generation of the first image data, the first image data is so generated that the direction toward the lower side of the source image coincides with the detected vertical direction when the first display section displays the image indicated by the first image data.

6 Claims, 13 Drawing Sheets

FIG. 7A
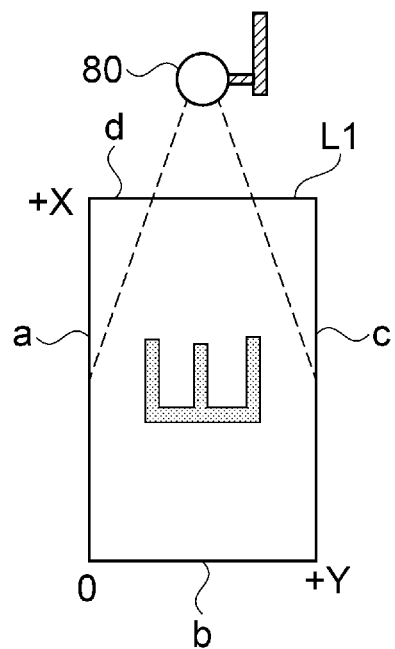
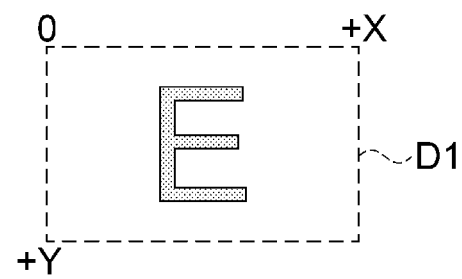
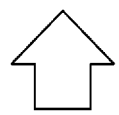
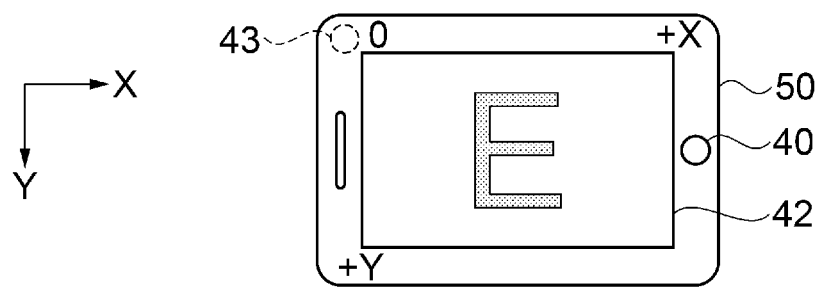

FIG. 7B
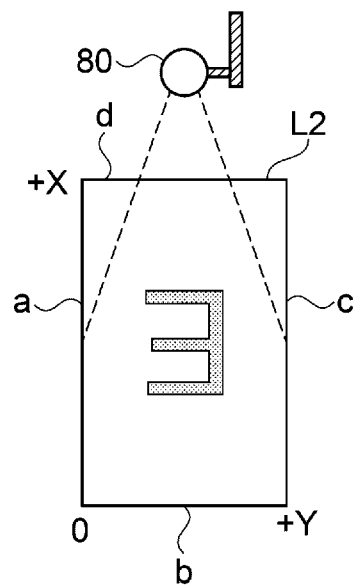
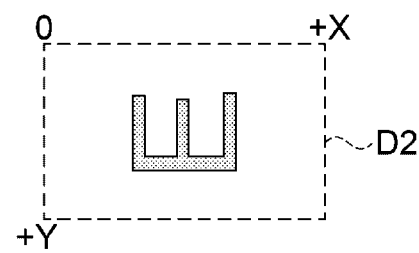
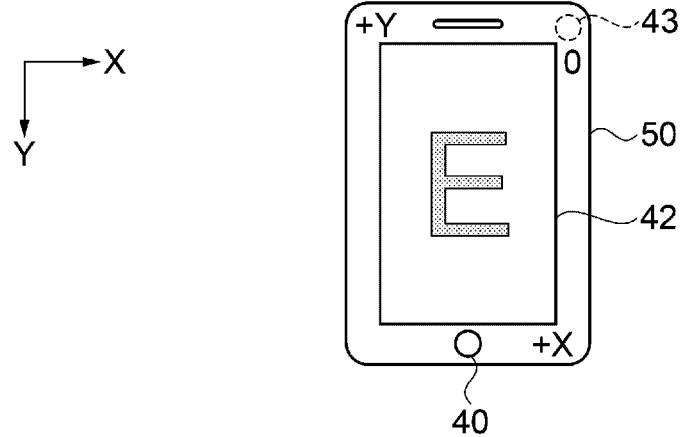

FIG. 7C
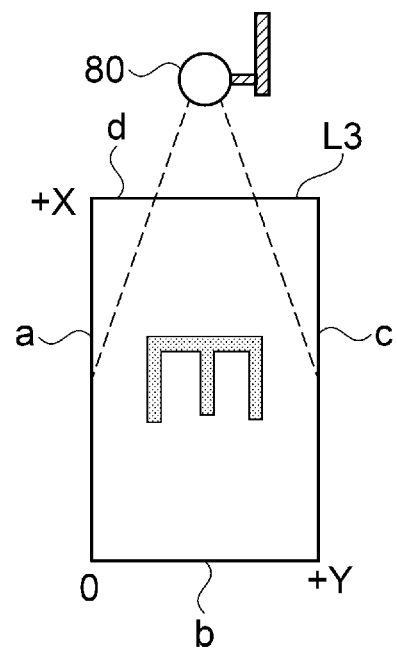
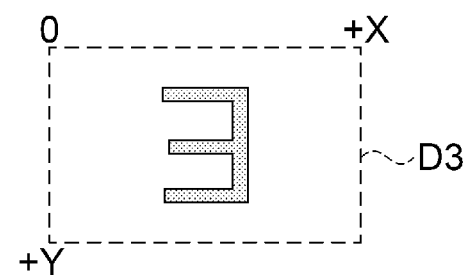
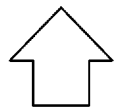
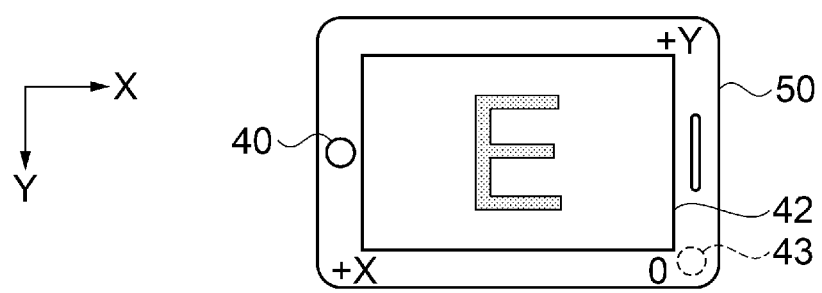

FIG. 7D
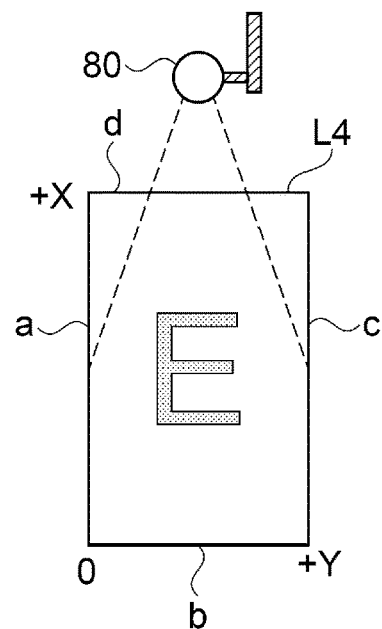
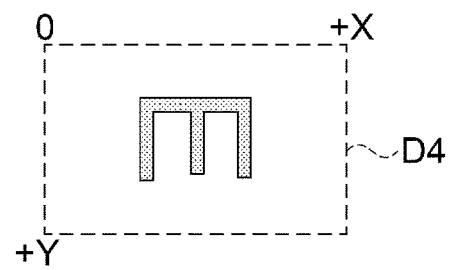
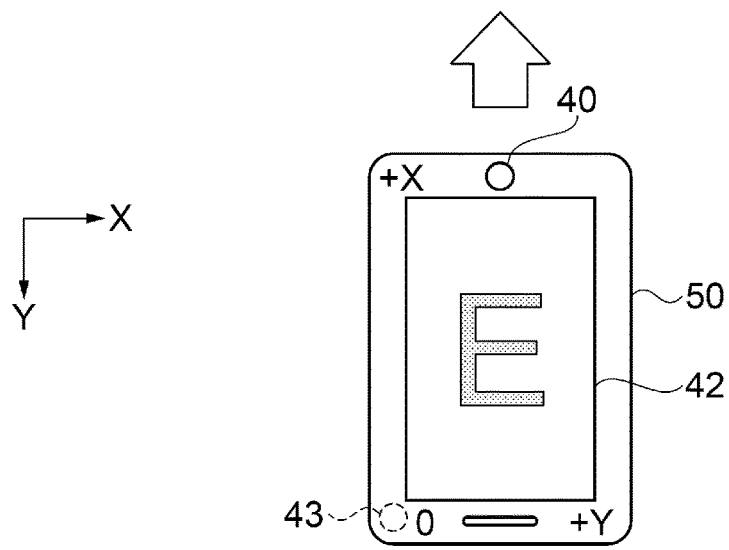

METHOD FOR CONTROLLING TERMINAL APPARATUS AND NON-TRANSITORY COMPUTER-READABLE STORAGE MEDIUM STORING A CONTROL PROGRAM FOR CONTROLLING TERMINAL APPARATUS

The present application is based on, and claims priority from JP Application Serial Number 2019-152634, filed Aug. 23, 2019, the disclosure of which is hereby incorporated by reference herein in its entirety.

BACKGROUND

1. Technical Field

The present disclosure relates to a method for controlling a terminal apparatus and a program for controlling the terminal apparatus.

2. Related Art

A projector is used in different installation aspects, such as floor installation and ceiling suspended installation, in accordance with the application of the projector. Therefore, unlike a projected image in the standard floor installation, a projected image in the ceiling suspended installation, in which the top side and the bottom side of the projector are reversed, is therefore undesirably an upside-down image. The upside-down image is inconvenient because the image itself, an operation menu screen, and the like are also inverted, and technologies developed in view of the problem have been proposed.

For example, the projector described in JP-A-2010-122485 includes an image rotation prism that rotates images formed by liquid crystal light valves around the optical axis. The image rotation prism is rotated to rotate the images to change the orientation of the projected image.

Digital signage using an illumination-type projector has recently become popular in a shop, a showroom, and other facilities. Such a compact, light-weight projector is installed at a variety of locations, for example, an advertisement image is projected on a ceiling or a floor surface in some cases, which means that the orientation of the projected image varies. Further, there has been a need for transmission of image data from an information terminal apparatus, such as a smartphone, to the projector.

The technology described in JP-A-2010-122485, however, requires a complicated mechanism dedicated to the projector. In detail, the image rotation prism, an associated mechanism, and other components are necessary in JP-A-2010-122485. Further, to transmit an image source from an information terminal apparatus that excels in portability, such as a smartphone, the orientation of an image displayed in the display section of the information terminal device does not undesirably coincide with the orientation of the image projected by the projector in many cases. As another problem, it is not easy to align the orientations of the two images with each other. The problems are not limited to a projector and common to display apparatuses in general, such as liquid crystal displays.

SUMMARY

A terminal apparatus control method according to an aspect of the present specification is a method for controlling a terminal apparatus that includes a first display section and a motion sensor that detects an attitude of the first display section with respect to a gravity direction and supplies image data to a display apparatus including a second display section, the method including causing the motion sensor to detect a vertical direction, rotating a source image in accordance with the detected vertical direction and generating corresponding first image data, causing the first display section of the terminal apparatus to display an image indicated by the first image data, and transmitting the first image data to the display apparatus. In the generation of the first image data, the first image data is so generated that a direction toward a lower side of the source image coincides with the detected vertical direction when the first display section displays the image indicated by the first image data.

In the generation of the first image data, the source image may be discretely rotated by 90°.

The method for controlling a terminal apparatus may further includes setting candidate first coordinate axes that are coordinate axes of the first display section of the terminal apparatus and candidate second coordinate axes that are coordinate axes of the second display section of the display apparatus and selecting first coordinate axes that maximize a range over which the image indicated by the first image data is displayed. The second coordinate axes may be fixed, and the first coordinate axes may be fixed even when the vertical direction changes.

The terminal apparatus may include an imaging section. When the display apparatus displays a first image specified by the first image data on the second display section, the imaging section may capture an image of the first image, and the terminal apparatus may evaluate whether or not the captured image of the first image contains a pattern that coincides with a predetermined pattern in the source image.

In the vertical direction detection performed by the motion sensor, when the vertical direction is not detected, image data on the source image may be used with no change and displayed on the first display section and the image data may be transmitted to the display apparatus, and the first display section may display an operation screen that accepts operation of rotating the source image.

The terminal apparatus may be a portable information terminal apparatus, and the display apparatus may be a projector.

A non-transitory computer-readable storage medium storing a control program according to another aspect of the present application includes a control program used with a display system that includes a terminal apparatus including a first display section and a motion sensor that detects an attitude of the first display section with respect to a gravity direction and a display apparatus including a second display section, the control program executed by the terminal apparatus, the control program including causing the motion sensor to detect a vertical direction, rotating a source image in accordance with the detected vertical direction and generating corresponding first image data, causing the first display section of the terminal apparatus to display an image indicated by the first image data, and transmitting the first image data to the display apparatus. In the generation of the first image data, the first image data is so generated that a direction toward a lower side of the source image coincides with the detected vertical direction when the first display section displays the image indicated by the first image data.

BRIEF DESCRIPTION OF THE DRAWINGS

FIG. 7A shows a display aspect in the display system.

FIG. 7B shows a display aspect in the display system.

FIG. 7C shows a display aspect in the display system.

FIG. 7D shows a display aspect in the display system.

DESCRIPTION OF EXEMPLARY EMBODIMENTS

Embodiment 1

Overview of Display System

Figure 1:
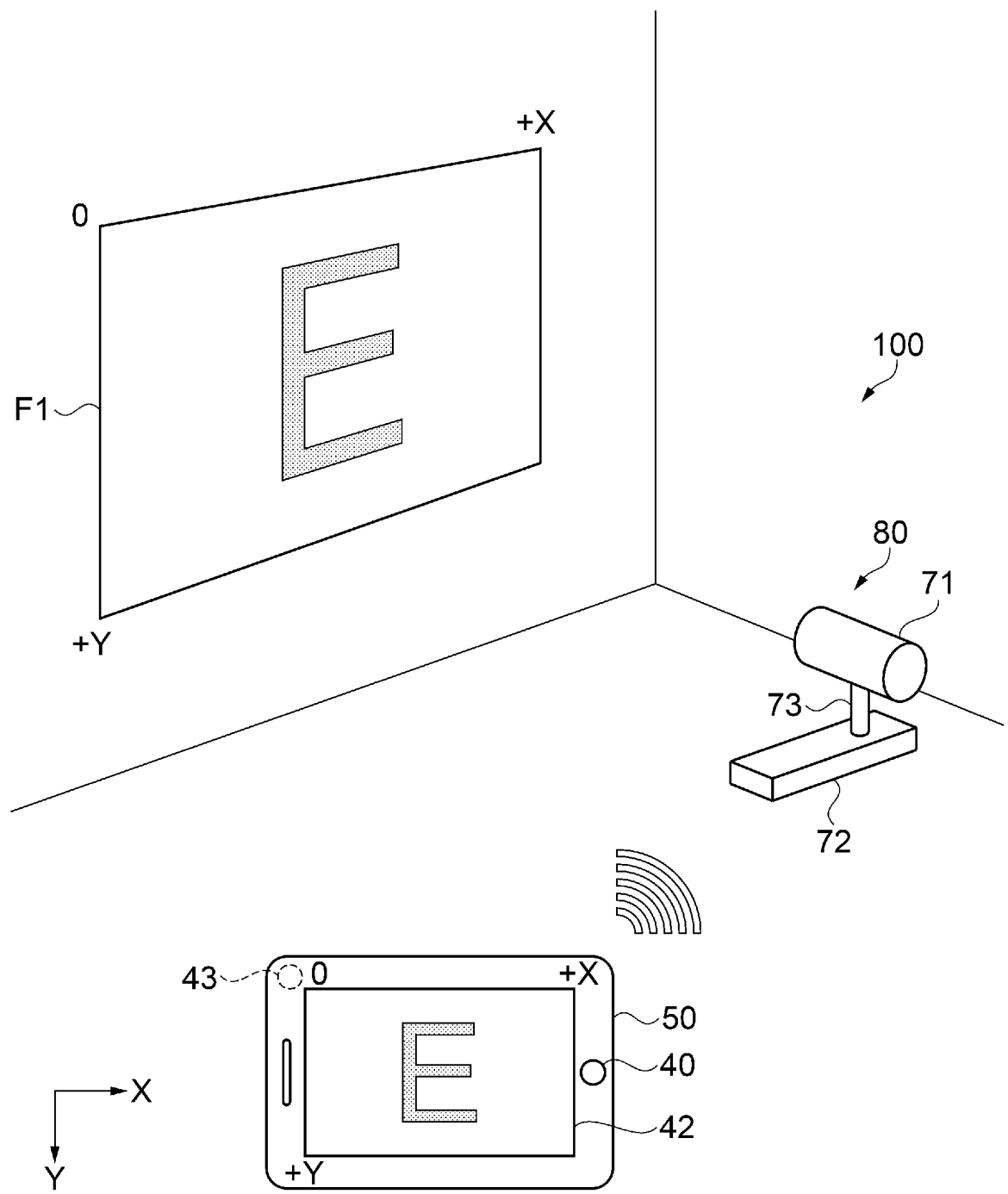
FIG. 1 is a schematic configuration diagram of a display system according to Embodiment 1.

FIG. 1 is a schematic configuration diagram of a display system according to the present embodiment.

A display system 100 is formed of a smartphone 50 as a terminal apparatus, and a projector 80 as a display apparatus, as shown in FIG. 1.

The smartphone 50 is a typical smartphone and includes a display section 42 as a first display section, an operation button 40, an imaging section 43, and other components. The operation button 40 is an activation button used to activate the smartphone 50 and has a fingerprint authentication function. The imaging section 43 is provided on the rear side of the smartphone 50 with the display section 42 provided on a front side.

The projector 80 is an illumination-type projector that can be installed on a ceiling, a wall surface, and other surfaces. The projector 80 is formed, for example, of a main body section 71, an installation section 72, and an arm section 73. The main body section 71 is a cylindrical projector that mimics a spotlight and projects an image specified by image data. The installation section 72 is a flat-plate-shaped installation section and accommodates a power supply unit and other components. The arm section 73 is an arm that couples the main body section 71 to the installation section 72. A portion of the arm section 73 that is the portion coupled to the main body section 71 is provided with a swing mechanism that allows adjustment of the orientation of the main body section 71.

FIG. 1 shows that the smartphone 50 transmits image data to the projector 80 over a wireless LAN. The projector 80 is installed on the floor and projects an image specified by the received image data on a wall surface to form a projection image F1 as a second display section.

The smartphone 50 has an oblong shape in the plan view and is held by an operator with the oblong shape oriented horizontally. The short edges of the smartphone 50 substantially extend along the direction of the vertical line. The direction in which the long edges of the smartphone 50 extend is also called a direction X. The side facing the operation button 40 in the direction X is also called a right side, and the side facing the imaging section 43 in the direction X is also called a left side. The direction in which the short edges of the smartphone 50 extend is also called a direction Y. The direction X is also called a horizontal direction, and the direction Y is also called a vertical direction.

The display section 42 of the smartphone 50 displays a letter E substantially at the center of a horizontally elongated oblong screen. The projection image F1 projected by the projector 80 also shows a letter E having an image orientation that coincides with the image orientation of E displayed on the smartphone 50. The coincidence is a result of execution of an image direction adjustment program in the present embodiment executed by the smartphone 50, and the two display sections display images in an appropriate direction across the screens of the display sections. The image direction adjustment program will be described later.

The coordinate axes of the projection image F1 from the projector 80 are fixed. In detail, when the projector 80 is installed on the floor and directly faces the wall surface, the coordinate axes have an origin O, which coincides with the upper left corner of the projection image F1 having a horizontally elongated oblong shape, as shown in FIG. 1. The coordinate axes correspond to second coordinate axes and are fixed in the setting of the hardware of the projector 80. Therefore, also when the projector 80 is so installed as to be suspended from the ceiling and when the projection screen is so displayed that the long edges thereof extend vertically, an image oriented based on the coordinates axes is displayed.

In contrast, an image displayed on the smartphone 50 rotates in accordance with the orientation of the display section 42. The orientation of the image displayed on the smartphone 50 therefore does not coincide with the orientation of the projection image F1 from the projector 80 in many cases. The situation described above will be described later in detail.

Configurations of Smartphone and Projector

Figure 2:
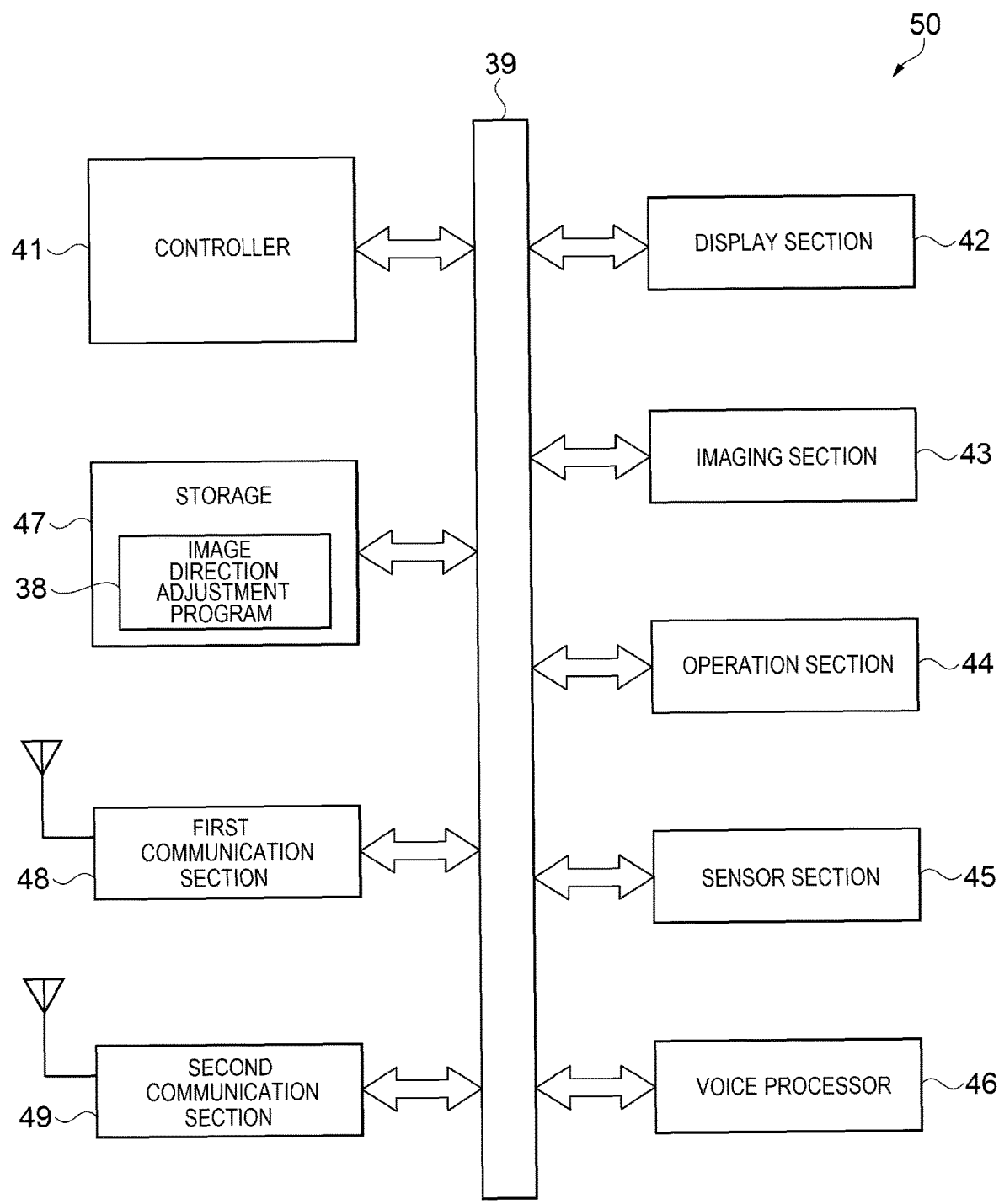
FIG. 2 is a block diagram showing a schematic configuration of a smartphone.

FIG. 2 is a block diagram showing a schematic configuration of the smartphone.

The smartphone 50 is formed of a controller 41, the display section 42, the imaging section 43, an operation section 44, a sensor section 45, a voice processor 46, a storage 47, a first communication section 48, a second communication section 49, and other components. The controller 41 is coupled to the portions described above via a system bus 39.

The controller 41 includes one or more processors. The controller 41 operates in accordance with an operating system (OS) and application programs stored in the storage 47 to oversee and control the action of the smartphone 50.

The display section 42 includes a display device, such as a liquid crystal display and an organic electro-luminescence (EL) display and displays an image based on image data.

The imaging section 43 is a camera including an imaging device, such as a CCD (charge coupled device) sensor or a CMOS (complementary metal oxide semiconductor) sensor. The imaging section 43 performs imaging under the control of the controller 41 and outputs captured image data to the controller 41.

The operation section 44 is formed of a touch panel integrated with the display section 42, the operation button 40, and other components and accepts operation inputted by the operator. When the operator operates the operation section 44, the operation section 44 outputs an operation signal according to the content of the operation to the controller 41 via the system bus 39.

The sensor section 45 is a motion sensor including a three-axis acceleration sensor and a three-axis gyro (angular velocity) sensor. The sensor section 45 outputs sensed signals to the controller 41 via the system bus 39 in accordance with a sampling frequency specified in advance.

The voice processor 46 is formed of a microphone, a loudspeaker, and other components. The voice processor 46 converts digital voice data provided via the system bus 39 into analog voice data and outputs the analog voice data via the loudspeaker, and the voice processor 46 further samples an analog voice signal inputted from the microphone, converts the sampled analog voice signal into digital data, and outputs the digital data.

The storage 47 is formed of a RAM (random access memory), a ROM (read only memory), and other memories. The storage 47 stores the OS, the application programs, a variety of data, and other pieces of information. The application programs also include an image direction adjustment program 38 and an OCR (optical character recognition/reader) program. The variety of data also include a plurality of sets of image data and data on pattern images contained in the image data sets.

The first communication section 48 is a communication section that operates in a dual mode in which data is transmitted and received to and from a nearby base station that is not shown via an antenna based on a third-generation mobile communication system compliant with the IMT-2000 standard and a fourth-generation mobile communication system compliant with the IMT-Advance standard.

The second communication section 49 includes a wireless communication device for performing wireless communication based, for example, on a wireless LAN (local area network) or Bluetooth (registered trademark). The communication section 49 transmits and receives information via wireless connection to and from an external apparatus, such as the projector 80, under the control of the controller 41.

Figure 3:
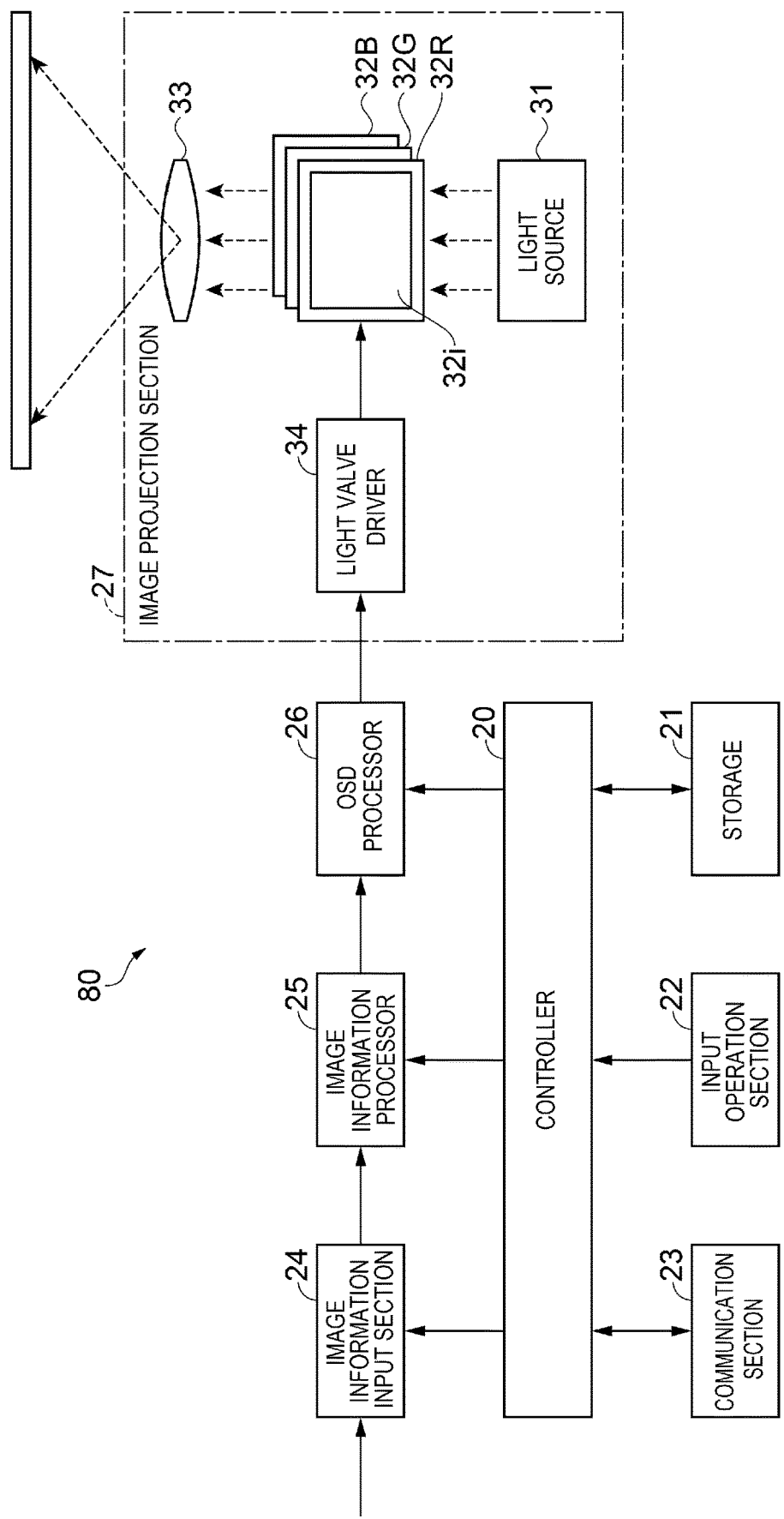
FIG. 3 is a block diagram showing a schematic configuration of a projector.

FIG. 3 is a block diagram showing a schematic configuration of the projector.

The projector 80 is formed of a controller 20, a storage 21, an input operation section 22, a communication section 23, an image information input section 24, an image information processor 25, an OSD processor 26, an image projection section 27, and other components, as shown in FIG. 3.

The projector 80 projects an image via the image projection section 27 based on image data inputted to the image information input section 24.

The controller 20 includes one or more processors and operates in accordance with a control program stored in the storage 21 to oversee and control the action of the projector 80.

The storage 21 is formed of a RAM and a ROM. The RAM is used to temporarily store a variety of data and other pieces of information, and the ROM stores a control program, control data, and other pieces of information for controlling the action of the projector 80.

The input operation section 22 includes a plurality of operation keys that allow the operator to issue a variety of instructions to the projector 80. Examples of the operation keys provided as the input operation section 22 include a "power key" for switching the state of the power supply between on and off, a "menu key" that causes a menu for a variety of settings to be displayed, and "direction keys" for selecting an item in the menu. When the operator operates any of the variety of operation keys of the input operation section 22, the input operation section 22 outputs an operation signal according to the content of the operation to the controller 20. A remote control (not shown) that allows remote operation of the projector 80 may instead be used as the input operation section. In this case, the remote control issues an infrared operation signal according to the content of operation performed by the operator, and a remote control signal receiver that is not shown receives the operation signal and forwards the operation signal to the controller 20.

The communication section 23 includes a wireless communication device for performing wireless communication based, for example, on a wireless LAN or Bluetooth. The communication section 23 transmits and receives information via wireless connection to and from an external apparatus, such as the smartphone 50, under the control of the controller 20.

The image information input section 24 is coupled to an external image supplier (not shown), such as a computer and an image reproduction apparatus, and receives image information supplied from the image supplier. The image information input section 24 can receive image information stored in the storage 21 and supplied from the controller 20. The image information input section 24 performs a variety of types of image processing as required on the image information inputted from the image supplier or the controller 20 and outputs the processed image information to the image information processor 25 under the control of the controller 20.

The image information processor 25 performs necessary image processing on the image information inputted from the image information input section 24 and outputs the processed image information to the OSD processor 26 under the control of the controller 20.

The OSD processor 26 carries out the process of superimposing an OSD (on-screen display) image, such as a message image and a menu image, on an input image and displaying the resultant image under the control of the controller 20. The OSD processor 26 includes an OSD memory that is not shown but stores OSD image information representing figures, fonts, and other objects for forming OSD images. When the controller 20 instructs superposition of an OSD image, the OSD processor 26 reads necessary OSD image information from the OSD memory and combines the OSD image information with the image information inputted from the image information processor 25 in such a way that the OSD image is superimposed in a predetermined position on the input image. The image information with which the OSD image information has been combined is outputted to a light valve driver 34 in the image projection section 27.

The image projection section 27 is formed of a light source 31, three liquid crystal light valves 32R, 32G, and 32B as light modulators, a projection lens 33 as a projection system, the light valve driver 34, and other components. In the image projection section 27, the liquid crystal light valves 32R, 32G, and 32B modulate light outputted from the light source 31 to form image light, which is projected via the projection lens 33.

The light source 31 includes a solid-state light source, such as a light emitting diode and a semiconductor laser. A discharge-type light source lamp, such as an ultrahigh-pressure mercury lamp and a metal halide lamp, may instead be used. The light outputted from the light source 31 is converted by an optical integration system that is not shown into light having a substantially uniform luminance distribution, separated by a color separation optical system that is not shown into three primary color light components, a red (R) component, a green (G) component, and a blue (B)

component, which are then incident on the liquid crystal light valves 32R, 32G, and 32B, respectively.

The liquid crystal light valves 32R, 32G, and 32B are each formed, for example, of a transmissive liquid crystal panel including a liquid crystal material encapsulated between a pair of transparent substrates. The liquid crystal panels each have a rectangular image formation area 32i formed of a plurality of pixels arranged in a matrix, and drive voltage is applicable to the liquid crystal material on a pixel basis.

The light valve driver 34 forms an image in the image formation area 32i of each of the liquid crystal light valves 32R, 32G, and 32B. Specifically, the light valve driver 34 applies drive voltage according to the image information inputted from the OSD processor 26 to each of the pixels in the image formation area 32i to allow the pixel to have optical transmittance according to the image information. The light outputted from the light source 31 passes through the image formation area 32i of each of the liquid crystal light valves 32R, 32G, and 32B, which modulate the light on a pixel basis into image light fluxes according to the image information on a color light basis. The thus formed color image light fluxes are combined with one another on a pixel basis by a light combining system that is not shown into image light representing a color image, which is then enlarged and displayed by the projection lens 33.

The image information input section 24, the image information processor 25, and the OSD processor 26 may be formed, for example, of one or more processors or may each be formed of a dedicated processor, such as an application specific integrated circuit (ASIC) and a field programmable gate array (FPGA).

Case where Image Directions do not Coincide with Each Other

Figure 4:
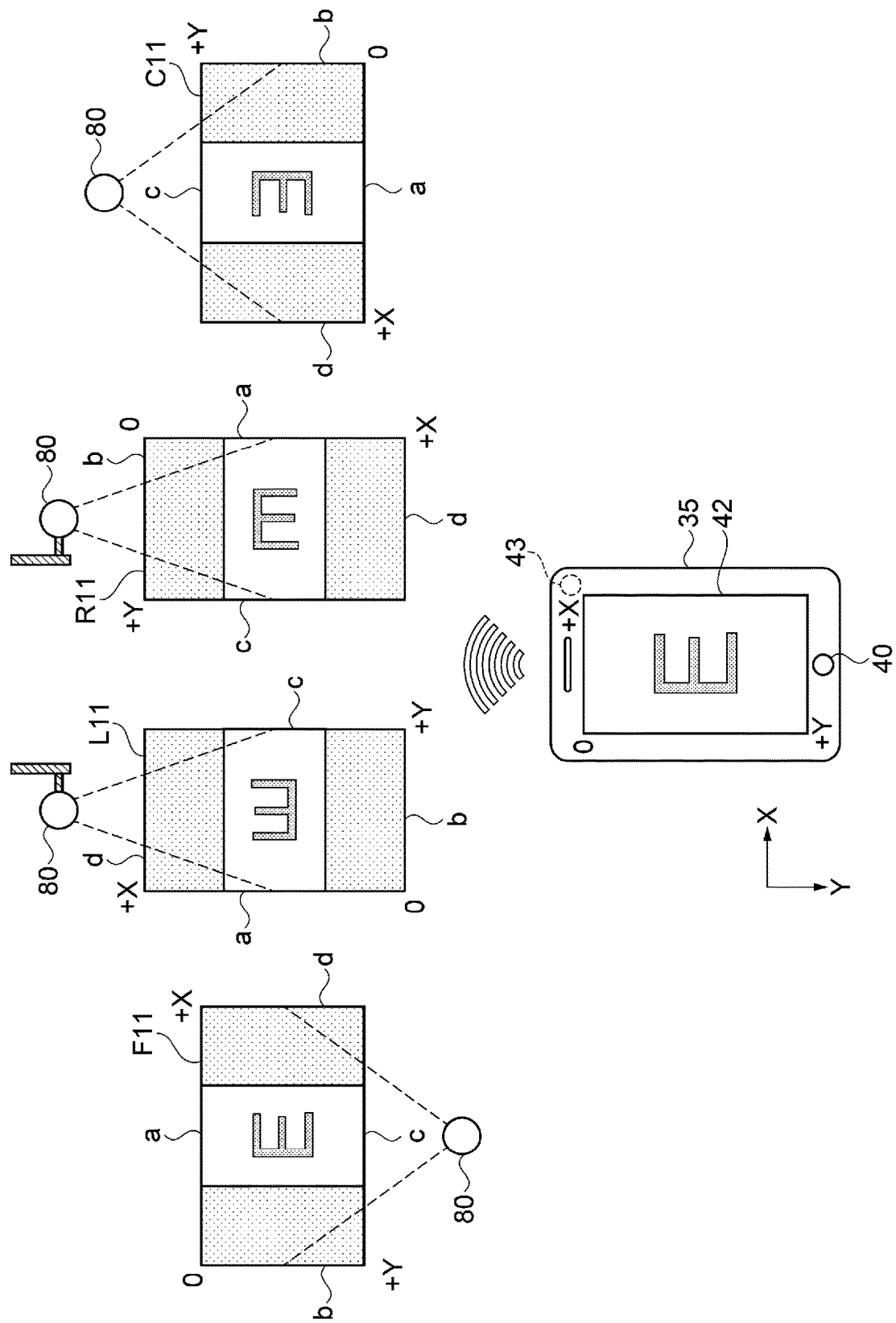
FIG. 4 is a display aspect diagram in a display system according to Comparative Example.

FIG. 4 shows display aspects in a display system according to Comparative Example.

Before the description of the image direction adjustment program in the present embodiment, the display aspects in the display system according to Comparative Example, which does not use the program, will be described.

A smartphone 35 in Comparative Example has no image direction adjustment program installed thereon. The other configurations of the smartphone 35 are the same as those of the smartphone 50. In the following description, the same portions as those in the above description have the same numbers, and no redundant description of the same portions will be made.

The projector 80 is the same projector in the above description. FIG. 4 shows four representative projection aspects of the projector 80.

First, a leftmost projection image F11 is a projection image projected when the projector 80 is installed on the floor and directly faces a wall surface, as in FIG. 1. In the case of the projection image F11, the upper left corner of the projection image F11, which has a horizontally elongated oblong shape, is an origin O. In detail, assuming that an upper edge a is the −Y-direction-side long edge of the oblong shape, that a left side b is the short edge on the left of the side a, that a lower edge c is the long edge facing the upper edge a, and that a right edge d is the short edge facing the left edge b, the origin O is the intersection of the upper edge a and the left edge b. In a coordinate system formed of coordinate axes having the origin O, the upper edge a corresponds to an axis X, and the left edge b corresponds to an axis Y. The floor-installed, direct-facing projection is a basic installation aspect of the projector 80 and has the fixed coordinates axes.

The expression of the upper edge a, the left edge b, the lower edge c, and the right edge d is used also in the description of the other display aspects.

The display section 42 of the smartphone 35 is vertically elongated, and the imaging section 43 is located in an upper portion of the smartphone 35. The longs edges of the smartphone 35 substantially extend along the direction of the vertical line. The display section 42 displays a letter E substantially at the center of the vertically elongated screen. The OS of a typical smartphone has the function of changing the orientation of an image in accordance with the attitude of the smartphone. In detail, the mechanism of the function is as follows: A motion sensor detects the gravity direction; and an image is so displayed that the gravity direction faces the lower side of the image. The smartphone 35 has the same function, and the display section 42 displays an image so appropriately oriented that the letter E is readable with the direction +Y, which is the gravity direction, facing the lower side of the image, as shown in FIG. 4. In this case, the coordinates axes of the image on the smartphone 35 are the coordinates axes having the origin O that coincides with the upper left corner of the vertically elongated display section 42. It is noted that the coordinate axes of the image coincide with the coordinate axes of the image data.

An image based on the image data transmitted from the smartphone 35 having the attitude described above to the projector 80 is an image having vertical black bands on opposite sides along the long edges of the image, as does the projection image F11. That is, the projection image F11 in the floor-installed, direct-facing projection is an image having vertical black bands on opposite sides of the image because the projector 80 is so set that the coordinate axes of the image data match and inscribe the coordinate axes of the projector 80. That is, since an entire image based on the image data is displayed with the coordinate axes of the image data matching the coordinate axes of the projector 80, the projected image is reduced in size and has black bands on the opposite sides thereof.

A next projection image L11 is a projection image projected when the projector 80 is installed on the ceiling and projects a vertically elongated image on a wall surface. Installing the projector 80 in such a way that the projector 80 is suspended, for example, from a light rail on the ceiling is also called ceiling suspended installation. The wall surface on which the images are projected is the same wall surface. In the case of the projection image L11, the upper edge a is the left edge of image, the left edge b is the lower edge of the image, and the origin O is located at the lower left corner of the image. The installation aspect is also called ceiling-suspended, upper/left projection.

Also in the ceiling-suspended, upper/left projection, the image has vertical black bands on opposite sides along the long edges of the image, as does the projection image L11. Further, since the upper edge a of the screen is on the left, the letter E is also rotated by 90°, so that it is difficult for the operator directly facing the projector 80 to look at the image. The reason why the image has the black bands on opposite sides is the same as the reason in the description of the floor-installation, direct-facing projection.

A next projection image R11 is a projection image projected when the projector 80 is installed on the ceiling and projects a vertically elongated image on the wall surface, but the upper side a is oriented rightward. In detail, in the case of the projection image R11, the upper edge a is the right edge of image, the left edge b is the upper edge of the image, and the origin O is located at the upper right corner of the image. The installation aspect is also called ceiling-suspended, upper/right projection.

Also in the ceiling-suspended, upper/right projection, the image has vertical black bands on opposite sides along the long edges of the image, as does the projection image R11. Further, since the upper edge a of the screen is on the right, the letter E is also rotated by 90° in the direction opposite the rotation direction in the projection image R11, so that it is difficult for the operator directly facing the projector 80 to look at the image. The reason why the image has the black bands on opposite sides is the same as the reason in the description of the floor-installation, direct-facing projection.

A rightmost projection image C11 is a horizontally elongated projection image projected when the projector 80 is installed on the ceiling in the upside-down floor-installed, direct-facing projection. In detail, in the case of the projection image C11, the upper edge a is the lower edge of image, the left edge b is the right edge of the image, and the origin O is located at the lower right corner of the image. The installation aspect is also called ceiling-suspended, inverted projection.

Also in the ceiling-suspended, inverted projection, the image has vertical black bands on opposite sides along the long edges of the image, as does the projection image C11. Further, since the upper edge a of the screen is the lower edge of the screen, the letter E is also inverted, so that it is difficult for the operator directly facing the projector 80 to look at the image. The reason why the image has the black bands on opposite sides is the same as the reason in the description of the floor-installation, direct-facing projection.

As described above, when the smartphone 35, on which no image direction adjustment program is installed, transmits image data with the imaging section 43 located in an upper portion of the smartphone 35, an appropriate image cannot be produced in any of the four projection aspects of the projector 80. The operator can change the orientation of the image by inputting operation via the input operation section 22 of the projector 80, but the operation is not readily performed.

Figure 5:
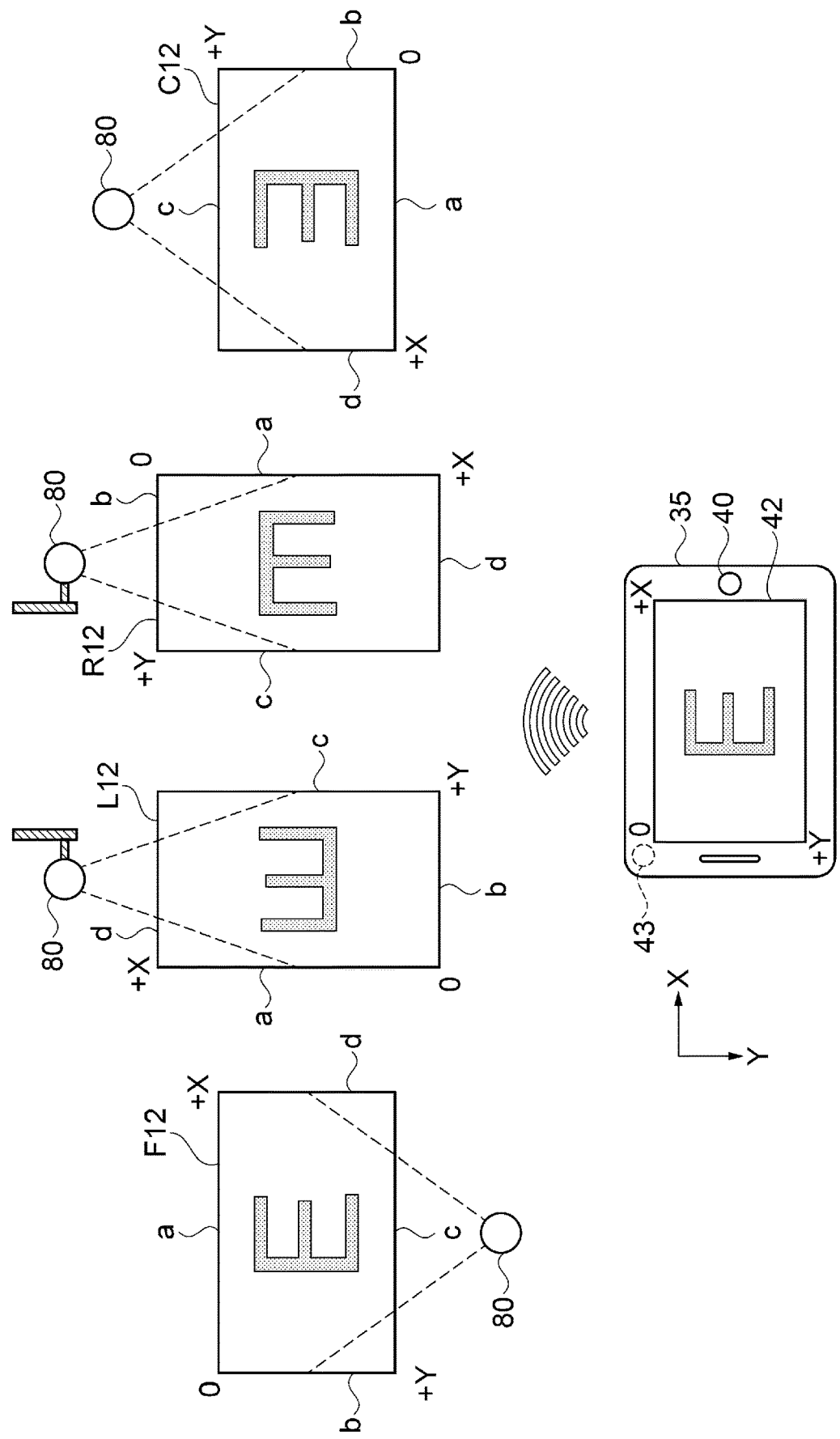
FIG. 5 is a display aspect diagram in the display system according to Comparative Example.

FIG. 5 shows display aspects in the display system according to Comparative Example and corresponds to FIG. 4. In FIG. 4, the case where the smartphone 35 is so disposed that the long edges thereof extend vertically and a projection image from the projector 80 undesirably has the black bands on opposite sides of the image has been described, and orienting the smartphone 35 with the long edges thereof extending horizontally can solve the problem of black bands. In detail, since the projector 80 is so set that the coordinate axes thereof match the coordinate axes of image data, as described above, orienting the smartphone 35 with the long edges thereof extending horizontally allows the long edges in the two display sections to coincide with each other.

In the smartphone 35, the display section 42 is horizontally elongated, and the operation button 40 is located in a right portion of the smartphone 35. The short edges of the smartphone 35 substantially extend along the direction of the vertical line. The display section 42 displays the letter E substantially at the center of the horizontally elongated screen. The coordinates axes of the image on the smartphone 35 having the attitude described above are the coordinates axes having the origin O that coincides with the upper left corner of the horizontally elongated display section 42. It is noted that the coordinate axes of the image coincide with the coordinate axes of the image data.

A leftmost projection image F12 is a projection image projected when the projector 80 is installed on the floor and directly faces the wall surface. In the case of the projection image F12, the upper left corner of the projection image F12, which has a horizontally elongated oblong shape, is the origin O. The projection image F12 shows the letter E having an image orientation that coincides with the image orientation of E displayed on the smartphone 35. The projection image F12 is an appropriate image with no black band.

A next projection image L12 is a projection image in the ceiling-suspended, upper/left projection. In the case of the projection image L12, the upper edge a is the left edge of image, the left edge b is the lower edge of the image, and the origin O is located at the lower left corner of the image. The projection image L12 is a full image displayed across the screen with no black band. On the other hand, since the upper edge a of the screen is on the left, the letter E is also rotated by 90°, so that it is difficult for the operator directly facing the projector 80 to look at the image.

A next projection image R12 is a projection image in the ceiling-suspended, upper/right projection. In the case of the projection image R12, the upper edge a is the right edge of image, the left edge b is the upper edge of the image, and the origin O is located at the upper right corner of the image. The projection image R12 is a full image displayed across the screen with no black band. On the other hand, since the upper edge a of the screen is on the right, the letter E is also rotated by 90° in the direction opposite the rotation direction in the projection image L12, so that it is difficult for the operator directly facing the projector 80 to look at the image.

A rightmost projection image C12 is a projection image in the ceiling-suspended, inverted projection. In the case of the projection image C12, the upper edge a is the lower edge of image, the left edge b is the right edge of the image, and the origin O is located at the lower right corner of the image. The projection image C12 is a full image displayed across the screen with no black band. On the other hand, since the upper edge a of the screen is the lower edge, the letter E is also inverted, so that it is difficult for the operator directly facing the projector 80 to look at the image.

As described above, orienting the smartphone 35 with the long edges thereof extending horizontally can solve the problem of the black bands, but the image is appropriately displayed only in one of the four projection aspects, and it is still difficult to provide an appropriate image in a simple method. Further, even when the appropriate projection aspect can be selected, changing the attitude of the smartphone 35 undesirably changes the orientation of the projected image, and it is therefore necessary to maintain the attitude of the smartphone 35. Not only is it hard to maintain the attitude, but the smartphone 35 cannot be used for another application, resulting in no user friendliness. In FIG. 5, the horizontally elongated orientation that causes the operation button 40 to located on the right has been described. Also when the smartphone 35 is rotated by 180° to achieve the laterally elongated orientation that causes the operation button 40 to located on the left, the same problem occurs, that is, the image is appropriately displayed only in one of the four projection aspects.

Image Direction Adjustment Program and Control Method

Figure 6:
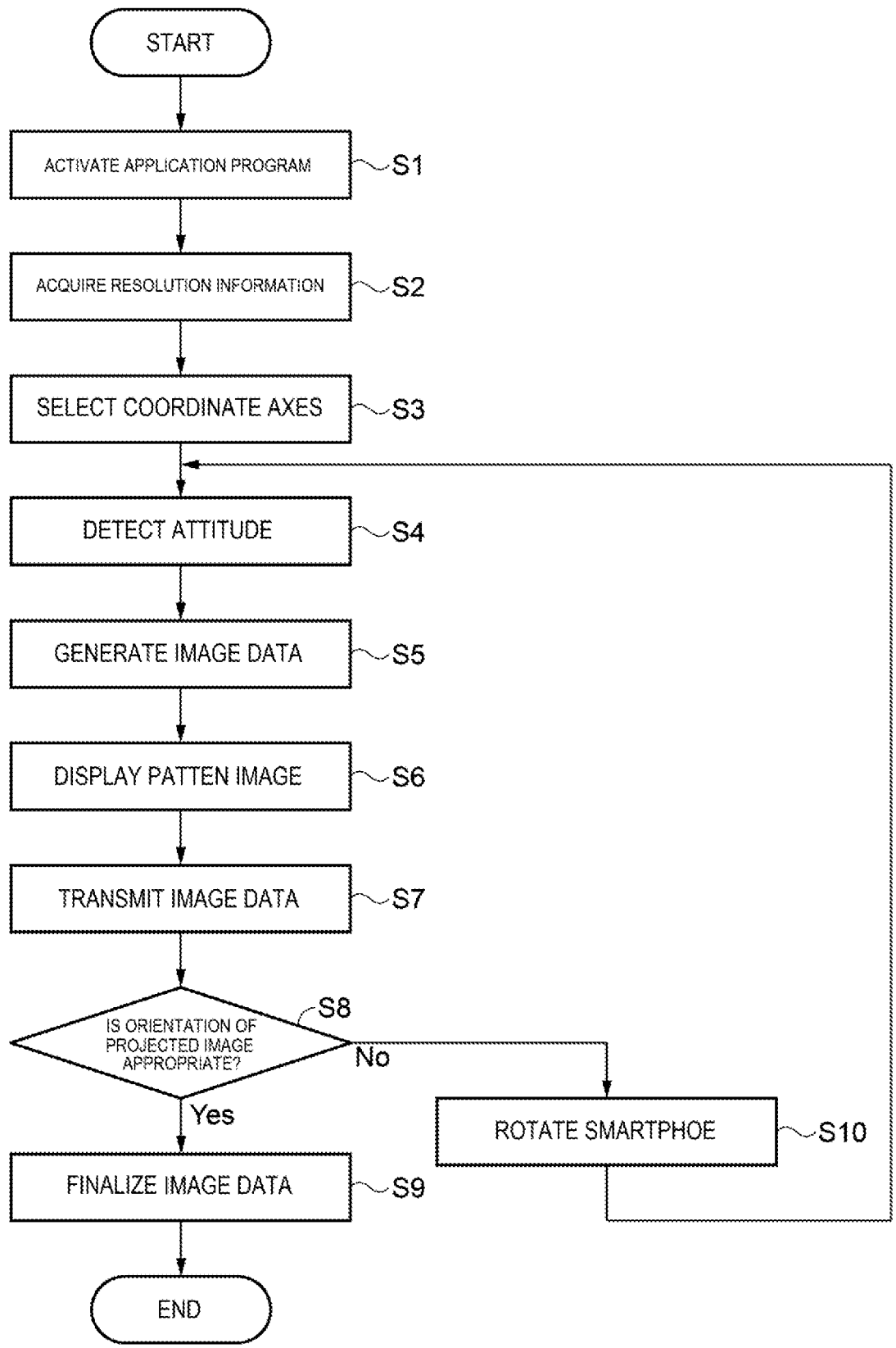
FIG. 6 is a flowchart showing the procedure of processes in an image direction adjustment program.

FIG. 6 is a flowchart showing the procedure of processes in the image direction adjustment program. FIGS. 7A to 7D show display aspects in the display system according to the present embodiment.

An image direction adjustment method carried out by the smartphone 50 on which the image direction adjustment program has been installed will be described below with reference to primarily FIG. 6 along with FIGS. 7A to 7D. The description will be made on the assumption that the projector 80 displays an image in the ceiling-suspended, upper/left projection, and that the operator holds the smartphone 50 in a position where the operator directly faces the projected image. In the following description, the primary component that carries out the steps of the image direction adjustment method is the controller 41 (FIG. 2) of the smartphone 50, and each portion of the smartphone 50 is controlled along the procedure of the processes in the image direction adjustment program stored in the storage 47.

In step S1, the operator selects the image direction adjustment program from the application programs in the smartphone 50 and activates the image direction adjustment program. The program may instead be automatically activated when the smartphone 50 detects the projector, for example, via the wireless LAN.

In step S2, the smartphone 50 is connected to the projector 80 via the wireless LAN and acquires information on the resolution of the projector 80.

In step S3, coordinate axes that allow maximum display is selected based on the acquired resolution data from the candidate coordinate axes of the projector 80 and the candidate coordinate axes of the smartphone 50. That is, the coordinate axes of the smartphone 50 are so set that the range over which an image based on first image data that will be described later is maximized. In detail, the long edges in the coordinate system formed of the coordinate axes in the resolution data are aligned with the long edges in the coordinate system formed of the coordinate axes of the smartphone 50. For example, in a case shown in FIG. 7A, the smartphone 50 is oriented with the long edges thereof extending horizontally, and the operation button 40 is located on the right. The coordinate axes of the image on the smartphone 50 having the attitude described above are the coordinate axes having the origin O that coincides with the upper left corner of the horizontally elongated the display section 42, and these coordinate axes are selected. The coordinate axes correspond to first coordinate axes and are fixed even when the vertical direction changes in the following process procedure.

In step S4, the attitude of the smartphone 50 is detected based on data sensed with the sensor section 45 (FIG. 2). In detail, the motion sensor of the sensor section 45 detects the direction of the display section 42 of the smartphone 50 with respect to the gravity direction. For example, in the case shown in FIG. 7A, the motion sensor detects that the short edges of the smartphone 50 oriented with the long edges thereof extending horizontally substantially extend along the direction of the vertical line, and that the +Y-direction coordinate axis is oriented toward the lower side of the gravity direction.

In step S5, image data representing an appropriate image is generated on the display section 42 of the smartphone 50 having the detected attitude. In detail, image data D1 is so generated as the first image data that the lower side of a source image coincides with the lower side of the gravity direction. The source image is rotated discretely by 90°. The source image contains a pattern image. In the case shown in FIG. 7A, the letter E corresponds to a predetermined pattern in the source image. The predetermined pattern is not limited to the letter E and may be an image containing a letter or a pattern that allows identification of the upper, lower, right, left sides of the letter or the pattern. For example, the predetermined pattern may be image data representing a landscape image containing a letter or a pattern.

In step S6, the display section 42 displays an image containing the pattern image indicated by the generated image data D1. The display section 42 of the smartphone 50 so oriented with the long edges thereof extending horizontally thus displays the letter E across the full screen.

In step S7, the same image data D1 as the image data displayed on the display section 42 is transmitted to the projector 80 over the wireless LAN. Since the coordinate axes are fixed in step S3 as described above, the transmitted image data D1 is horizontally elongated image data having the origin 0 located at the upper left corner of the image data, as shown in FIG. 7A. The projector 80 then projects an image specified by the image data D1.

In step S8, the operator evaluates whether or not the orientation of the image projected by the projector 80 is appropriate. In detail, the operator evaluates the appropriateness by looking at the projected image. When the orientation of the projected image is appropriate, the control proceeds to step S9. When the orientation of the projected image is inappropriate, the control proceeds to step S10. For example, in the case shown in FIG. 7A, the letter E is oriented horizontally in a projection image L1 from the projector 80, and the operator determines that the orientation is inappropriate, and the control proceeds to step S10.

In step S10, the smartphone 50 is rotated. In detail, the operator rotates the smartphone 50 clockwise by 90°. After the smartphone 50 is rotated, the control automatically returns to step S4. FIG. 7B shows the state in which the smartphone 50 has been rotated. The rotation of 90° causes the smartphone to have a vertically elongated attitude in which the operation button 40 is located in a lower portion of the smartphone 50, as shown in FIG. 7B. Carrying out steps S4 to S7 in this attitude causes the display section 42 of the smartphone 50 oriented with the long edges thereof extending vertically to display the letter E across the screen. Image data D2 to be transmitted to the projector 80 is horizontally elongated image data having the origin O located at the upper left corner thereof and containing the letter E rotated by 90°.

Again in step S8, the operator evaluates whether or not the orientation of the projected image is appropriate. In a projection image L2 shown in FIG. 7B, the letter E is inverted, and the operator therefore determines that the orientation is inappropriate, and the control proceeds to step S10.

Again in step S10, the operator rotates the smartphone 50 clockwise by 90°. After the smartphone 50 is rotated, the control automatically returns to step S4. FIG. 7C shows the state in which the smartphone 50 has been rotated. The rotation of 90° causes the smartphone 50 to have a horizontally elongated attitude in which the operation button 40 is located in a left portion of the smartphone 50, as shown in FIG. 7C. Carrying out steps S4 to S7 in this attitude causes the display section 42 of the smartphone 50 oriented with the long edges thereof extending horizontally to display the letter E across the screen. Image data D3 to be transmitted to the projector 80 is horizontally elongated image data having the origin O located at the upper left corner thereof and containing the letter E rotated by 180°.

Once again in step S8, the operator evaluates whether or not the orientation of the projected image is appropriate. In a projection image L3 shown in FIG. 7C, the letter E is rotated, and the operator therefore determines that the orientation is inappropriate, and the control proceeds to step S10.

Once again in step S10, the operator rotates the smartphone 50 clockwise by 90°. After the smartphone 50 is rotated, the control automatically returns to step S4. FIG. 7D shows the state in which the smartphone 50 has been rotated. The rotation of 90° causes the smartphone 50 to have a vertically elongated attitude in which the operation button 40 is located in an upper portion of the smartphone 50, as shown in FIG. 7D. Carrying out steps S4 to S7 in this attitude causes the display section 42 of the smartphone 50 oriented with the long edges thereof extending vertically to display the letter E across the screen. Image data D4 to be transmitted to the projector 80 is horizontally elongated image data having the origin O located at the upper left corner thereof and containing the letter E rotated by 90°.

Again in step S8, the operator evaluates whether or not the orientation of the projected image is appropriate. The operator determines that a projection image L4 shown in FIG. 7D is an enlarged image similar to the image on the smartphone 50 and therefore determines that the direction and size of the projection image L4 is appropriate, and the control proceeds to step S9.

In step S9, the image data is finalized. In detail, the operator presses an image direction coincidence button, which represents that the image directions coincide with each other, in the operation menu displayed on the smartphone 50 to finalize the image data D4 to be actually projected image data. Thereafter, image data that conforms to the image direction and the coordinate axes in the image data D4 is transmitted irrespective of the attitude of the smartphone 50.

The above description has been made of the case where the installation aspect of the projector 80 is the ceiling-suspended, upper/left projection, and the image direction can be similarly adjusted also in other three installation aspects.

Effects of Embodiment 1

As described above, according to the display system 100, an appropriate projection image can be set by a simple method in a variety of projection aspects by executing the image direction adjustment program in the smartphone 50 with the initial setting of the projector 80 unchanged. In detail, when the projected image is not appropriate, an appropriate image can be readily selected by rotating the smartphone 50 to change the vertical direction.

The display system 100 is therefore simple and user friendly because an application program in the smartphone 50 only needs to be executed with the initial specification of the projector 80 unchanged, unlike the related-art projector that requires a dedicated complicated mechanism and operation to provide an appropriate projected image.

Further, after an appropriate image is finalized in step S9, image data that conforms to the image direction and the coordinate axes in the selected image data is transmitted irrespective of the attitude of the smartphone 50, whereby the smartphone 50 can be used with no concern about the attitude thereof.

Therefore, according to the display system 100, which has a simple configuration, the easy operation of rotating the smartphone 50 allows the orientation of an image projected by the projector 80 to readily coincide with the orientation of an image displayed on the smartphone 50. In other words, the image direction adjustment program and the control method allow the orientation of an image displayed on the smartphone 50 to readily and easily coincide with the orientation of an image projected by the projector 80.

Embodiment 2

Different Aspect of Image Direction Adjustment Program

Figure 8:
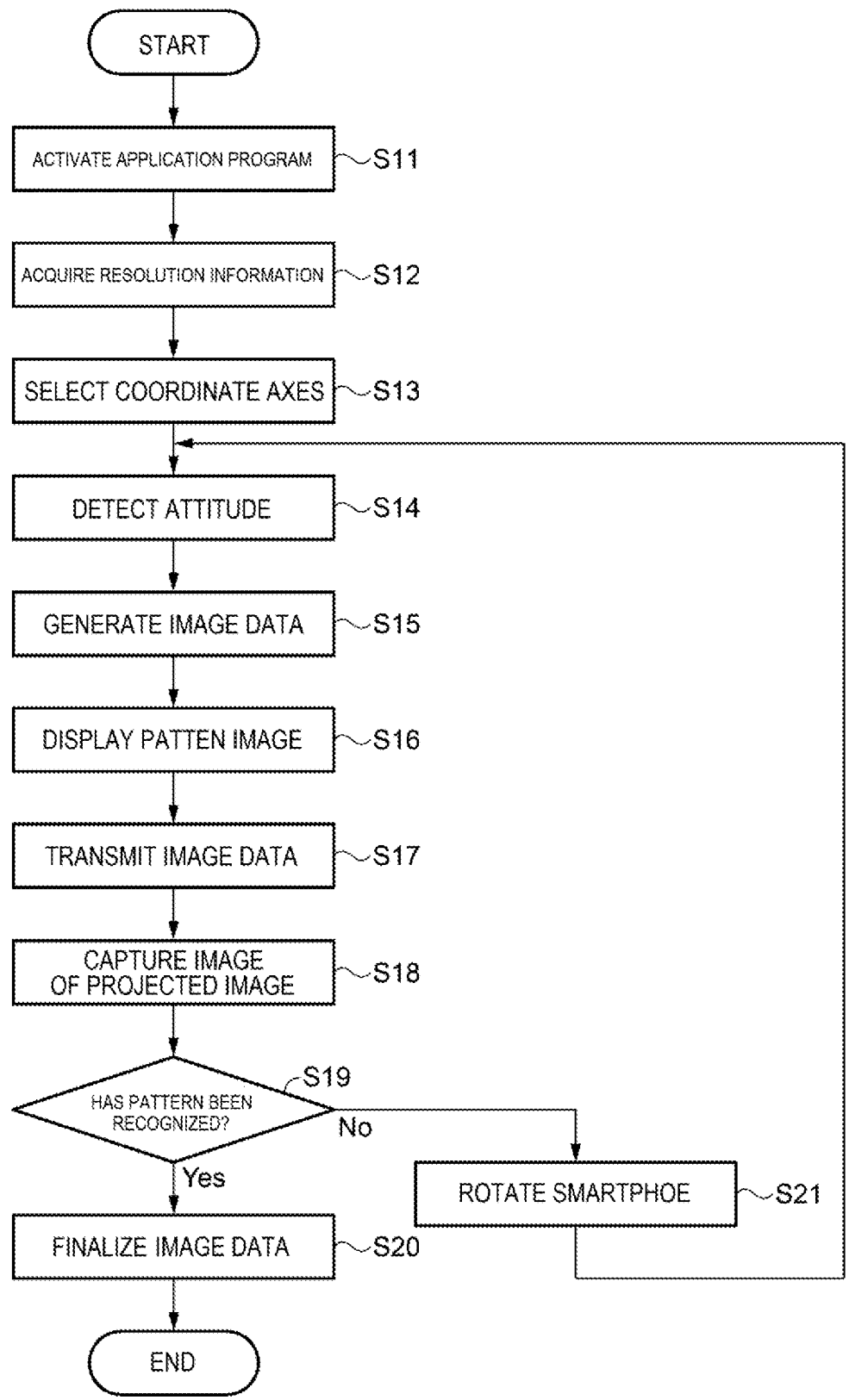
FIG. 8 is a flowchart of an image direction adjustment program according to Embodiment 2.
Figure 9:
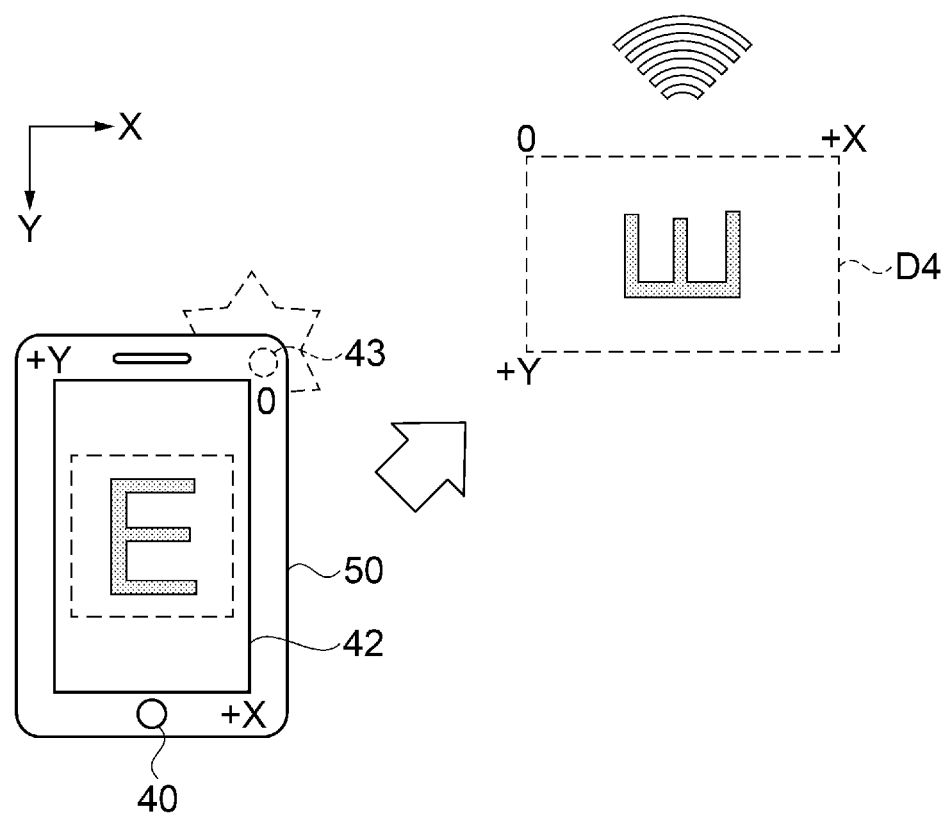
FIG. 9 shows a display aspect in the display system.

FIG. 8 is a flowchart showing the procedure of processes in the image direction adjustment program in the present embodiment and corresponds to FIG. 6. FIG. 9 shows a display aspect in the display system 100 according to the present embodiment. The image direction adjustment program in the present embodiment is an automated version of the image direction adjustment program in Embodiment 1.

An image direction adjustment method carried out by the smartphone 50 on which the image direction adjustment program in the present embodiment has been installed will be described primarily with reference to FIG. 8 along with FIGS. 6 and 9.

The description will be made on the assumption that the projector 80 displays a projection image R1 in the ceiling-suspended, upper/right projection, and that the operator holds the smartphone 50 in a position where the operator directly faces the projected image, as shown in FIG. 9. The smartphone 50 is oriented with the long edges thereof extend vertically, and the operation button 40 is located in a lower portion of the smartphone 50. The storage 47 (FIG. 2) of the smartphone 50 stores the image direction adjustment program in the present embodiment. The same contents as those in Embodiment 1 will not be described.

First, steps S11 to S17 in FIG. 8 are the same as steps S1 to S7 in FIG. 6. In step S17, the image data D4 is transmitted from the smartphone 50 to the projector 80. The projector 80 projects the projection image R1 indicated by the image data D4.

In step S18, the imaging section 43 of the smartphone 50 captures an image of the projection image R1 as the first image. In detail, the imaging section 43 captures an image of the projection image R1 containing the pattern image.

In step S19, pattern recognition is performed on data on the captured image of the projection image R1, and it is evaluated whether or not the pattern image can be recognized. In detail, an OCR program stored in the storage 47 of the smartphone 50 is executed to evaluate whether or not the captured image data contains a pattern that coincides with the stored pattern image. In the case shown in FIG. 9, comparison between the letter E, which is the stored pattern image, and the letter E in the captured image data shows that the two letters coincide with each other also in terms of the directions thereof. The control therefore proceeds to step S20.

Since it has been determined in step S19 that a pattern that coincides with the pattern image is contained, the image direction adjustment program automatically finalizes the image data in step S20. When it is determined in step S19 that the pattern does not coincide with the pattern image, which means that the direction of the projected image is inappropriate, the control proceeds to step S21, where the operator rotates the smartphone 50 clockwise by 90°. Steps S14 to S19 are then carried out again.

The above description has been made of the case where the installation aspect of the projector 80 is the ceiling-suspended, upper/right projection, and the image direction can be similarly adjusted also in other three installation aspects.

Effects of Embodiment 2

As described above, according to the image direction adjustment program in Embodiment 2, the OCR-based pattern recognition allows automated orientation of the projection image. In detail, an appropriate projection image is selected by capturing an image of a projection image and comparing the captured image data with the pattern image.

A more user-friendly image direction adjustment program and control method can be provided in addition to the effects provided by Embodiment 1.

Embodiment 3

Figure 10:
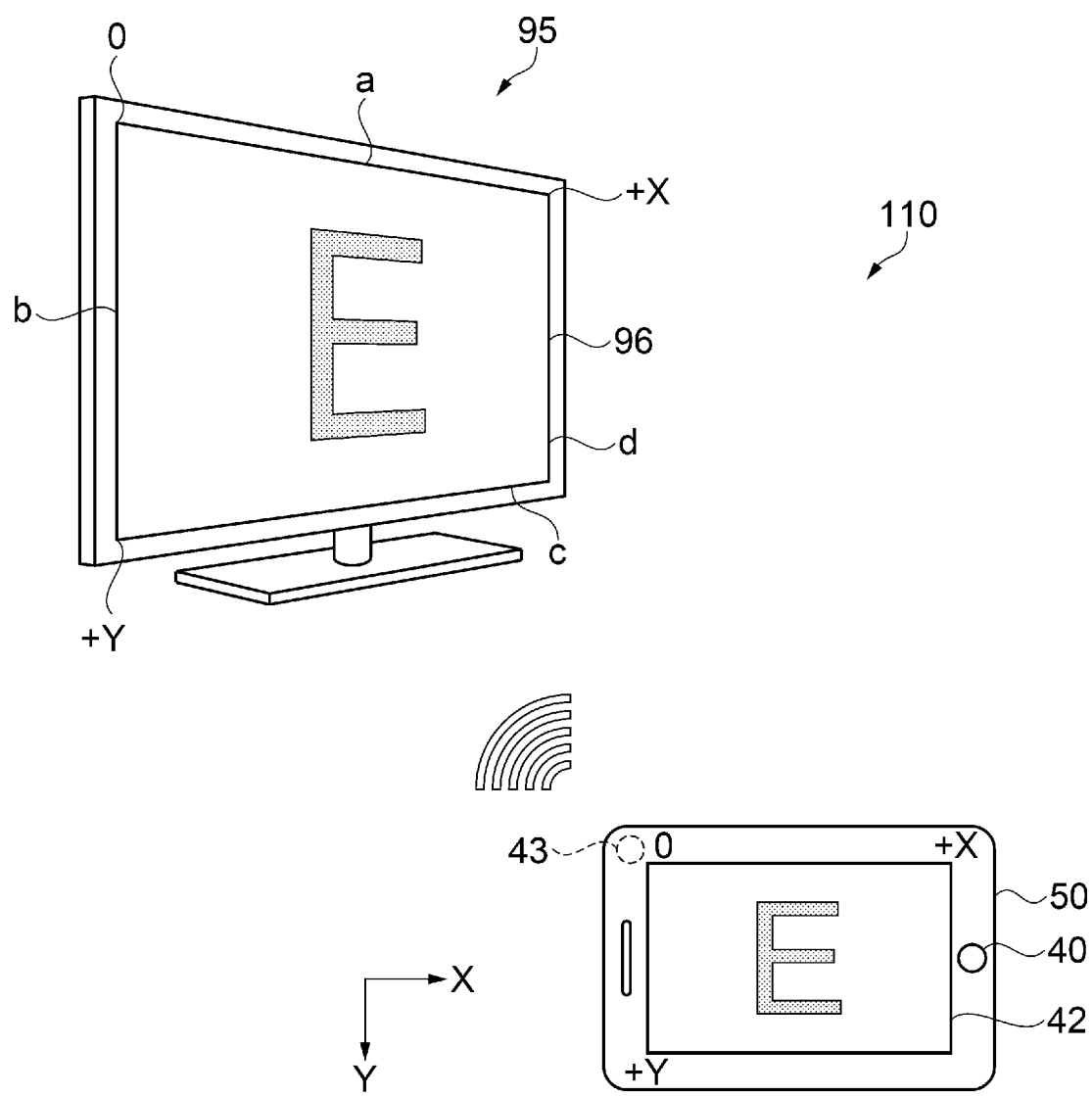
FIG. 10 is a schematic configuration diagram of a display system according to Embodiment 3.

FIG. 10 is a diagrammatic view showing a display system according to the present embodiment.

The aforementioned embodiments have been described on the assumption that the display apparatus in the display system is a projector, but not necessarily, and the display system may include a display section capable of displaying externally inputted image data.

An image direction adjustment method in a display system 110 according to the present embodiment will be described below primarily with reference to FIG. 10 along with FIG. 1.

The display system 110 according to the present embodiment is formed of the smartphone 50 as the terminal apparatus and a liquid crystal display 95 as the display apparatus, as shown in FIG. 10. The smartphone 50 is the smartphone described in the embodiments described above and has the image direction adjustment program installed thereon.

The liquid crystal display 95 is a display apparatus including a display section 96 formed of a liquid crystal panel and includes a communication section including a wireless LAN terminal for receiving externally inputted image data. The display section 96 has a horizontally elongated oblong shape and has an origin O, which coincides with the upper left corner of the display section 96. In detail, the intersection of an upper edge a, which corresponds to a long edge of the oblong shape, and a left edge b, which corresponds to a short edge of the oblong shape, is the origin O. That is, the coordinate axes of the display section 96 is formed of an axis X, which is the upper edge a, and an axis Y, which is the left edge b, and the intersection of the two axes is the origin O.

FIG. 10 shows a state which is achieved by execution of the image direction adjustment program by the smartphone 50 and in which the image on the display section 42 of the smartphone 50 matches the image on the display section 96 of the liquid crystal display 95. In detail, the smartphone 50 oriented with the long edges thereof extending horizontally so that the operation button 40 is located in a right portion of the smartphone 50 transmits image data containing the letter-E pattern image expressed in the coordinate system formed of the coordinate axes having the origin O, which coincides with the upper left corner of the display section 96, to the liquid crystal display 95. The liquid crystal display 95 displays the letter E in an image similar to the image on the smartphone 50 on the display section 96 across the screen thereof with the coordinate axes of the received image data matching the coordinate axes of the liquid crystal display 95.

As described above, the display apparatus of the display system 110 may be the liquid crystal display 95 or any of the following component: an electro-luminescence (EL) display; a plasma display; a cathode ray tube; and electronic paper. The same effects can also be provided by using any of the direct-view displays described above.

The smartphone 50 is not limited to a typical smartphone and may be a portable information terminal apparatus including a display section and capable of executing the image direction adjustment program. For example, the same effects can also be provided by using any of a tablet-shaped information terminal, a PDA (personal digital assistant), a wearable terminal, and an electronic paper terminal.

Effects of Embodiment 3

As described above, the display system 110 according to Embodiment 3 includes the smartphone 50 and the liquid crystal display 95, which is a direct-view display as the display apparatus. Even the configuration described above can readily align the orientation of an image displayed on the smartphone 50 with the orientation of an image displayed on the liquid crystal display 95, as in the embodiments described above.

Therefore, also in the displays system 110, which uses a direct-view display and has a simple configuration, the simple rotation operation allows the orientations of the two images to readily coincide with each other.

Variation 1

Variation 1 will be described with reference to FIG. 6.

In the embodiments described above, the motion sensor detects the direction of the smartphone 50 with respect to the gravity direction of the display section 42 in step S4, and it is conceivable that the direction cannot be detected. Even when the direction cannot be detected, the directions of the two images can be aligned with each other by changing part of the image direction adjustment program.

In detail, when the vertical direction cannot be detected, source image data that is image data on a source image is used with no change and displayed on the smartphone 50. The same source image data is then transmitted to the projector 80. At this point, whether the direction in the source image data does not need to be changed can be evaluated by looking at the projected image.

Subsequently, the display section 42 of the smartphone 50 displays an operation screen that accepts the operation of rotating the source image data and an operation screen for finalizing the image data. For example, the following operation buttons are displayed: "rotate image by 90°;" and "image directions coincide with each other." When the "rotate image by 90°" button is pressed, the source image data is rotated clockwise by 90°, and corresponding image data is generated and a corresponding projection image is displayed. The button is then repeatedly pressed until the image directions coincide with each other. In this process, the smartphone 50 does not need to be rotated.

When an appropriate projection image is displayed, the image data is finalized by pressing the "image directions coincide with each other" button. Image data that conforms to the image direction and the coordinate axes in the image data is then transmitted.

As described above, even when the vertical direction cannot be detected, the simple method of pressing the operation button while looking at the projected image allows the image orientations to coincide with each other.

Variation 2

Variation 2 will be described with reference to FIG. 1.

The aforementioned embodiments have been described with reference to the case where the smartphone 50 is connected to the projector 80 via a wireless LAN, but not necessarily, and the connection may be made by a communication component capable of transmitting and receiving necessary information, such as the resolution information and image data. For example, Bluetooth or wired connection may be used. As the wired connection, HDMI (high-definition multimedia interface (registered trademark), a USB (universal serial bus) cable, or a LAN cable may be used to connect the smartphone 50 to the projector 80. Even the connection methods described above allow the same effects as those provided by the embodiments and the variation described above to be provided.

Contents derived from the embodiments will be described below.

A terminal apparatus control method according to the present application is a method for controlling a terminal apparatus that includes a first display section and a motion sensor that detects the attitude of the first display section with respect to the gravity direction and supplies image data to a display apparatus including a second display section. The method includes causing the motion sensor to detect the vertical direction, rotating a source image in accordance with the detected vertical direction and generating corresponding first image data, causing the first display section of the terminal apparatus to display an image indicated by the first image data, and transmitting the first image data to the display apparatus. In the generation of the first image data, the first image data is so generated that the direction toward the lower side of the source image coincides with the detected vertical direction when the first display section displays the image indicated by the first image data.

According to the control method, when the image displayed on the second display section is an appropriate image displayed across the screen, the first image data can be used to display the appropriate image. When the image displayed on the second display section is an inappropriate image, rotating the terminal apparatus to change the vertical direction allows the operator to check whether the appropriate image is displayed by using the image data further rotated first image data. The simple method of rotating the terminal apparatus therefore allows the image on the terminal apparatus to coincide with the image on the display apparatus. Further, the method, which can be achieved by causing the terminal apparatus to execute a program, requires no complicated mechanism.

Therefore, according to the control method, which is used with a simple configuration, the easy operation of rotating the terminal apparatus allows the orientation of an image displayed on the terminal apparatus to readily coincide with the orientation of an image displayed on the display apparatus.

In the generation of the first image data, the source image may be discretely rotated by 90°.

The method described above allows the orientation of the image data to conform to the projector's basic projection aspect formed of four patterns representing the discrete rotation by 90°.

The method may further include setting candidate first coordinate axes that are the coordinate axes of the first display section of the terminal apparatus and candidate second coordinate axes that are the coordinate axes of the second display section of the display apparatus and selecting first coordinate axes that maximize the range over which the image indicated by the first image data is displayed. The second coordinate axes may be fixed, and the first coordinate axes may be fixed even when the vertical direction changes.

According to the method described above, the default setting of the display apparatus including the second display section may remain unchanged, and the coordinate axes of the image data transmitted from the terminal apparatus are fixed, whereby the image indicated by the first image data can still be displayed even when the terminal apparatus is rotated.

The terminal apparatus may include an imaging section. When the display apparatus displays a first image specified by the first image data on the second display section, the imaging section may capture an image of the first image. The terminal apparatus may evaluate whether or not the captured image of the first image contains a pattern that coincides with a predetermined pattern in the source image.

According to the method described above, whether or not the first image displayed on the display section of the display apparatus is appropriate can be automatically evaluated by pattern recognition.

In the vertical direction detection performed by the motion sensor, when the vertical direction cannot be detected, the image data on the source image may be used with no change and displayed on the first display section, the image data may be transmitted to the display apparatus, and the first display section may display an operation screen that accepts the operation of rotating the source image.

According to the method described above, even when the vertical direction cannot be detected, the simple method of pressing the operation button while looking at the projected image allows the orientations of the images to coincide with each other.

The terminal apparatus may be a portable information terminal apparatus, and the display apparatus may be a projector.

Therefore, in a display system formed of the portable information terminal apparatus and the projector, which therefore has a simple configuration, the easy operation of rotating the information terminal apparatus allows the orientation of an image displayed on the information terminal apparatus to readily coincide with the orientation of an image displayed on the projector.

A non-transitory computer-readable storage medium storing a control program according to the present application includes a control program used with a display system that includes a terminal apparatus including a first display section and a motion sensor that detects the attitude of the first display section with respect to the gravity direction and a display apparatus including a second display section, the control program executed by the terminal apparatus. The control program includes causing the motion sensor to detect the vertical direction, rotating a source image in accordance with the detected vertical direction and generating corresponding first image data, causing the first display section of the terminal apparatus to display an image indicated by the first image data, and transmitting the first image data to the display apparatus. In the generation of the first image data, the first image data is so generated that the direction toward the lower side of the source image coincides with the detected vertical direction when the first display section displays the image indicated by the first image data.

According to the non-transitory computer-readable storage medium storing the control program, when the image displayed on the second display section is an appropriate image displayed across the screen, the first image data can be used to display the appropriate image. When the image displayed on the second display section is an inappropriate image, rotating the terminal apparatus to change the vertical direction allows the operator to check whether the appropriate image is displayed by using the image data the further rotated first image data. The simple method of rotating the terminal apparatus therefore allows the image on the terminal apparatus to coincide with the image on the display apparatus.

Therefore, according to the non-transitory computer-readable storage medium storing the control program, the easy operation of rotating the terminal apparatus allows the orientation of an image displayed on the terminal apparatus to readily coincide with the orientation of an image displayed on the display apparatus.

What is claimed is:

1. A method for controlling a terminal apparatus that includes a first display section and a motion sensor that detects an attitude of the first display section with respect to a gravity direction and supplies image data to a display apparatus including a second display section, the first display section having four sides, the second display section having four sides, the method comprising:
    acquiring information on the four sides of the second display section;
    setting candidate first coordinate axes that are coordinate axes of the first display section based on the four sides of the first display section and candidate second coordinate axes that are coordinate axes of the second display section based on the acquired information on the four sides of the second display section;
    causing the motion sensor to detect a vertical direction;
    rotating a source image in accordance with the detected vertical direction and generating corresponding first image data;
    causing the first display section of the terminal apparatus to display an image indicated by the first image data; and
    transmitting the first image data to the display apparatus,
    wherein in the generation of the first image data, the first image data is so generated that a direction toward a lower side of the source image coincides with the detected vertical direction when the first display section displays the image indicated by the first image data,
    the setting of candidate first coordinate axes includes selecting first coordinate axes that maximize a range over which the image indicated by the first image data is displayed,
    the second coordinate axes are fixed, and
    the first coordinate axes are fixed even when the vertical direction changes.

2. The method for controlling a terminal apparatus according to claim 1, wherein in the generation of the first image data, the source image is discretely rotated by 90°.

3. The method for controlling a terminal apparatus according to claim 1,
    wherein the terminal apparatus includes an imaging section,
    when the display apparatus displays a first image specified by the first image data on the second display section, the imaging section captures an image of the first image, and
    the terminal apparatus evaluates whether or not the captured image of the first image contains a pattern that coincides with a predetermined pattern in the source image.

4. The method for controlling a terminal apparatus according to claim 1,
    wherein in the vertical direction detection performed by the motion sensor,
    when the vertical direction is not detected, image data on the source image is used with no change and displayed on the first display section, and the image data is transmitted to the display apparatus, and
    the first display section displays an operation screen that accepts operation of rotating the source image.

5. The method for controlling a terminal apparatus according to claim 1,
    wherein the terminal apparatus is a portable information terminal apparatus, and
    the display apparatus is a projector.

6. A non-transitory computer-readable storage medium storing a control program used with a display system that includes a terminal apparatus including a first display section and a motion sensor that detects an attitude of the first display section with respect to a gravity direction and a display apparatus including a second display section, the first display section having four sides, the second display section having four sides, the control program executed by the terminal apparatus, the control program comprises:
    acquiring information on the four sides of the second display section;
    setting candidate first coordinate axes that are coordinate axes of the first display section based on the four sides of the first display section and candidate second coordinate axes that are coordinate axes of the second display section based on the acquired information on the four sides of the second display section;
    causing the motion sensor to detect a vertical direction;
    rotating a source image in accordance with the detected vertical direction and generating corresponding first image data;
    causing the first display section of the terminal apparatus to display an image indicated by the first image data; and
    transmitting the first image data to the display apparatus,
    wherein in the generation of the first image data, the first image data is so generated that a direction toward a lower side of the source image coincides with the detected vertical direction when the first display section displays the image indicated by the first image data,
    the setting of candidate first coordinate axes includes selecting first coordinate axes that maximize a range over which the image indicated by the first image data is displayed,
    the second coordinate axes are fixed, and the first coordinate axes are fixed even when the vertical direction changes.

* * * * *